United States Patent
Sim et al.

(10) Patent No.: US 9,201,417 B2
(45) Date of Patent: Dec. 1, 2015

(54) METHOD OF MANUFACTURING AN ELONGATE COMPONENT

(75) Inventors: Wei-Ming Sim, Bristol (GB); Oluwamayokun Adetoro, London (GB); Pihua Wen, London (GB)

(73) Assignee: Airbus Operations Limited, Bristol (GB)

( * ) Notice: Subject to any disclaimer, the term of this patent is extended or adjusted under 35 U.S.C. 154(b) by 454 days.

(21) Appl. No.: 13/567,435

(22) Filed: Aug. 6, 2012

(65) Prior Publication Data

US 2013/0047416 A1 Feb. 28, 2013

(30) Foreign Application Priority Data

Aug. 22, 2011 (GB) .................................. 1114438.3

(51) Int. Cl.
| | | |
|---|---|---|
| *B23Q 17/00* | (2006.01) | |
| *B21D 53/88* | (2006.01) | |
| *B21D 47/00* | (2006.01) | |
| *B23P 17/00* | (2006.01) | |
| *B21D 7/00* | (2006.01) | |
| *B21C 51/00* | (2006.01) | |
| *B21D 9/05* | (2006.01) | |
| *G05B 19/18* | (2006.01) | |
| *B21D 5/00* | (2006.01) | |
| *B21D 5/02* | (2006.01) | |
| *B21D 7/12* | (2006.01) | |

(52) U.S. Cl.
CPC ................ *G05B 19/188* (2013.01); *B21D 5/00* (2013.01); *B21D 5/0281* (2013.01); *B21D 7/12* (2013.01); *G05B 2219/36203* (2013.01); *G05B 2219/49364* (2013.01); *Y10T 29/49* (2015.01)

(58) Field of Classification Search
CPC .................. G05B 19/188; G05B 2219/36203; G05B 19/49364; Y10T 29/49; B21D 5/00; B21D 5/02; B21D 5/0281; B21D 5/06; B21D 7/00; B21D 7/12
USPC ............... 29/407.01, 407.05, 407.08, 407.09, 29/897, 897.2; 72/31.1, 31.05, 31.11, 386, 72/389.1, 389.2
See application file for complete search history.

(56) References Cited

U.S. PATENT DOCUMENTS

| | | | | |
|---|---|---|---|---|
| 4,213,349 A | * | 7/1980 | Miura .............................. | 73/847 |
| 4,661,316 A | * | 4/1987 | Hashimoto et al. ........... | 420/418 |
| 4,802,357 A | * | 2/1989 | Jones .............................. | 72/17.3 |

(Continued)

FOREIGN PATENT DOCUMENTS

| | | |
|---|---|---|
| JP | 8-192230 | 7/1996 |
| JP | 2010/170710 | 6/2001 |

(Continued)

OTHER PUBLICATIONS

Search Report for GB 1114438.3, dated Dec. 7, 2011.

*Primary Examiner* — Essama Omgba
*Assistant Examiner* — Darrell C Ford
(74) *Attorney, Agent, or Firm* — Nixon & Vanderhye P.C.

(57) ABSTRACT

A method of manufacturing an elongate element (10) using a punching operation assumes a polynomial relationship between punch depth ($d_{punch}$) and neutral axis, with the constants being a polynomial function of plastic deformation of the beam. Using finite element analysis, a relationship between the required plastic deformation, the second moment of area of the element and the neutral axis of the element can be derived.

9 Claims, 5 Drawing Sheets

(56) References Cited

U.S. PATENT DOCUMENTS

| | | | |
|---|---|---|---|
| 4,864,509 A * | 9/1989 | Somerville et al. | 700/165 |
| 5,128,877 A * | 7/1992 | Tang | 700/146 |
| 5,839,310 A * | 11/1998 | Tokai et al. | 72/31.1 |
| 6,233,988 B1 * | 5/2001 | Kojima | 72/15.3 |
| 6,408,591 B1 * | 6/2002 | Yamashita et al. | 296/146.6 |
| 6,553,803 B1 * | 4/2003 | Heingartner et al. | 72/31.1 |
| 6,571,589 B1 * | 6/2003 | Ito et al. | 72/31.11 |
| RE38,340 E * | 12/2003 | Hao | 451/5 |
| 7,503,200 B2 * | 3/2009 | Gerritsen et al. | 72/389.5 |
| 2001/0009106 A1 * | 7/2001 | Gerritsen | 72/31.11 |
| 2003/0010078 A1 * | 1/2003 | Koyama et al. | 72/31.1 |
| 2003/0015011 A1 * | 1/2003 | Koyama et al. | 72/31.1 |
| 2003/0066325 A1 * | 4/2003 | Chebbi | 72/31.1 |
| 2003/0121303 A1 * | 7/2003 | Lanni et al. | 72/31.1 |
| 2004/0035178 A1 * | 2/2004 | Matsumoto et al. | 72/389.8 |
| 2004/0055348 A1 * | 3/2004 | Takahashi | 72/31.1 |
| 2006/0044490 A1 * | 3/2006 | Ichioka et al. | 349/58 |
| 2007/0186602 A1 * | 8/2007 | Cella | 72/31.1 |
| 2008/0254249 A1 * | 10/2008 | Hayashi et al. | 428/41.7 |
| 2009/0120156 A1 * | 5/2009 | Ikeda et al. | 72/389.1 |
| 2009/0158806 A1 * | 6/2009 | Faina | 72/369 |
| 2009/0162614 A1 * | 6/2009 | Deeley et al. | 428/167 |
| 2009/0293576 A1 * | 12/2009 | Shibata | 72/389.1 |
| 2010/0187788 A1 * | 7/2010 | Choi et al. | 280/124.106 |
| 2010/0204932 A1 * | 8/2010 | Sakai | 702/42 |
| 2013/0205911 A1 * | 8/2013 | Wang et al. | 73/812 |
| 2014/0102162 A1 * | 4/2014 | Morgenstern et al. | 72/324 |
| 2014/0366600 A1 * | 12/2014 | Kozaki et al. | 72/20.3 |

FOREIGN PATENT DOCUMENTS

| | | |
|---|---|---|
| KR | 2006-0020245 | 3/2006 |
| SU | 1574315 | 6/1990 |

\* cited by examiner

|  | a1 | a2 | a3 | a4 | a5 | a6 |  |  |
|---|---|---|---|---|---|---|---|---|
|  | (units in mm) | | | | | | | |
|  | BAA/BAF (x2) | TA | BFA/BFF (x2) | TF |  | TWA/TWF | H | Ixx, (mm$^4$) | Y, (mm) |
| Stringer 0 | 89.8 | 7.6 | 24 | 7.4 | 53 | 7.4 | 68 | 704543.74 | 22.14546 |
| Stringer I | 104.9 | 7.6 | 24 | 7.4 | 53 | 7.4 | 68 | 739720.16 | 20.62920 |
| Stringer II | 120 | 7.6 | 24 | 7.4 | 53 | 7.4 | 68 | 769563.35 | 19.34445 |
| Stringer III | 89.8 | 7.6 | 24 | 7.4 | 52 | 8.6 | 68 | 728486.01 | 22.71398 |
| Stringer IV | 89.8 | 7.6 | 24 | 7.4 | 50.8 | 9.8 | 68 | 751602.83 | 23.23089 |
| Stringer V | 89.8 | 7.6 | 24 | 9.6 | 50.8 | 7.4 | 68 | 754627.41 | 23.16860 |
| Stringer VI | 89.8 | 7.6 | 24 | 11.8 | 48.6 | 7.4 | 68 | 795442.03 | 24.07660 |
| Stringer VII | 89.8 | 9.4 | 24 | 7.4 | 51.2 | 7.4 | 68 | 733930.21 | 20.82694 |
| Stringer VIII | 89.8 | 11 | 24 | 7.4 | 49.6 | 7.4 | 68 | 746511.88 | 19.93825 |

| Punch, (mm) | 4 | 5 | 6 | 7 | 8 | 9 | 10 | 11 |
|---|---|---|---|---|---|---|---|---|
| | Plastic Deformation (mm) | | | | | | | |
| | ($\times 10^{-3}$) | ($\times 10^{-2}$) | ($\times 10^{-2}$) | ($\times 10^{-1}$) | ($\times 10^{-1}$) | ($\times 10^{-1}$) | | |
| Stringer 0 | 9.1217 | 9.1254 | 4.0511 | 2.9200 | 7.5267 | 13.4090 | 2.0039 | 2.6949 |
| Stringer I | 9.1217 | 9.1296 | 6.3094 | 3.6640 | 8.6546 | 14.8746 | 2.1711 | 2.8794 |
| Stringer II | 9.1187 | 9.1252 | 8.8301 | 4.2963 | 9.6177 | 16.0541 | 2.3047 | 3.0247 |
| Stringer III | 9.1214 | 6.9835 | 3.6533 | 2.2257 | 5.5627 | 10.3844 | 1.8662 | 2.5065 |
| Stringer IV | 9.1211 | 9.0434 | 3.2679 | 2.3605 | 6.2757 | 11.5668 | 1.7674 | 2.4243 |
| Stringer V | 9.0411 | 9.1246 | 2.2974 | 1.8126 | 5.4582 | 10.5878 | 1.6609 | 2.3897 |
| Stringer VI | 9.0351 | 9.1226 | 1.7536 | 1.3586 | 4.6110 | 9.51003 | 1.5394 | 2.1746 |
| Stringer VII | 8.7012 | 9.0885 | 6.6333 | 3.7711 | 8.8358 | 15.0986 | 2.2003 | 2.9144 |
| Stringer VIII | 9.1175 | 9.0706 | 8.8399 | 4.3199 | 9.6834 | 16.1519 | 2.3209 | 3.0473 |

METHOD OF MANUFACTURING AN ELONGATE COMPONENT

RELATED APPLICATION

This application claims priority to GB 1114438.3 filed 22 Aug. 2011, the entire contents of which is incorporated by reference.

BACKGROUND OF INVENTION

The present invention is concerned with a method of manufacturing elongate components. More particularly, the present invention is concerned with a method of manufacturing elongate aircraft components such as aircraft wing stringers by inducing plastic deformation by a differential contact three point bending operation.

Components such as aircraft stringers need to be shaped to the wing aerodynamic profile. In order to achieve this, stringers are plastically deformed by differential contact three point bending. By "differential contact three point bending" we mean a process by which the stringer is supported at two spaced positions on a first side. A punch is applied therebetween from a second, opposite side in order to induce a bending moment to cause local plastic deformation. Because the stringer deforms as the punch progresses, the contact area with the punch and the supports may change. This is not a classical three point bending load case (the forces are not point loads) and as such is defined as "differential contact".

One problem with this method is that the stringer will spring back after the bending moment is released due to its elasticity. Known methods of forming are non-predictive. The operator will attempt to estimate the amount of punch movement required to provide a given plastic deformation. The punch is applied to the stringer by the estimated value and the plastic deformation is measured once the punch is retracted. If the level of deformation is too low, the operator will estimate a further punch distance and reapply the punch. Successive bending operations are applied at the same position until the required deformation is achieved. The punch information is then stored and applied to the next component, and so on until the required "first time" punch movement is refined to a satisfactory degree.

A typical 18 m stringer will be have up to 250 punching locations along its length. As such it is desirable to reduce the number of punching operations at each station.

Should the stringer be overdeformed (i.e. undergo too much deformation when punched), scrapping the part is not feasible as such parts are very expensive. As such, an inverse bending moment (again, estimated by the operator) is applied to the component to reverse the deformation. Such repeated and reverse application of plastic deformation to the stringer can cause problems such as work hardening and fatigue.

Because of the complex and changing geometry of the stringers used in the aerospace sector, prediction of the stringer plastic deformation by analytical methods is not appropriate.

An alternative is to use numerical simulation, such as finite element analysis (FEA) to predict the deformation of the stringer at each punch location. Not only would the analysis of a single stringer need to be repeated at each punch stage (in order to arrive at the required plastic deformation), but because of the changing cross section of the stringer along its length, these analyses would need to be carried out for each discrete punch position. This would be extremely time consuming and costly with respect to computing resource.

SUMMARY OF THE INVENTION

It is an aim of the present invention to provide an improved method of manufacture which mitigates the "trial and error" method of the prior art, whilst utilising the benefits of numerical simulation without undue burden.

According to the invention there is provided a method of manufacturing an elongate component comprising the steps of:
providing a punching apparatus configured to apply a differential contact three point bending load to the component by advancing a punch at a punch location between two supports by a punch distance,
calculating a punch travel ($d_{punch}$) based on the second moment of inertia of the component at the punch location ($I_{xx}$), the location of the neutral axis distance of the component at the punch location (Y) and the required plastic deformation ($d_{plastic}$) of the component at the punch location,
bending the elongate component at the punch location by moving the punch by the punch travel.

Preferably the punch travel is calculated assuming that the required plastic deformation ($d_{plastic}$) is related to the second moment of inertia of the component at the punch location ($I_{xx}$), and the neutral axis distance at the punch location (Y) by an nth order polynomial of the form:

$$\frac{d_{plastic}}{I_{xx}} = \sum_{i=0}^{n} B_i Y^i$$

where $B_i$ are functions of the punch travel ($d_{punch}$).
Preferably:

$$B_i = \sum_{j=1}^{m} BB_{ij}(d_{punch} - d_{elastic})^j$$

where $BB_{ij}$ are constants.
Preferably which n=m=2; i.e. the polynomials are quadratic.
Preferably the punch travel is calculated from the expression:

$$d_{punch} = \left[ \frac{\left( \pm \sqrt{\begin{bmatrix} I_{xx}(BB_{1b}Y^2 + BB_{2b}Y + BB_{3b})^2 + \\ 4I_{xx}d_{plastic}(BB_{1a}Y^2 + BB_{2a}Y + BB_{3a}) \end{bmatrix}} - \right)}{2I_{xx}(BB_{1a}Y^2 + BB_{2a}Y + BB_{3a})} \right] - d_{elastic}$$

where $BB_{1a}$, $BB_{1b}$ etc are constants.
Preferably $d_{elastic}$ is calculated analytically from the cross section of the stringer at the punch location.
Constants $BB_{1a}$, $BB_{1b}$ etc are preferably calculated statistically from a representative sample of numerical simulations, which may be finite element analyses.

SUMMARY OF THE DRAWINGS

A method in accordance with the present invention will now be described with reference to the accompanying figures in which:

FIG. 3a is a table of results of various punching simulations;

FIG. 3b is a graph of the results of FIG. 3a;

DETAILED DESCRIPTION OF INVENTION

Figure 1A:
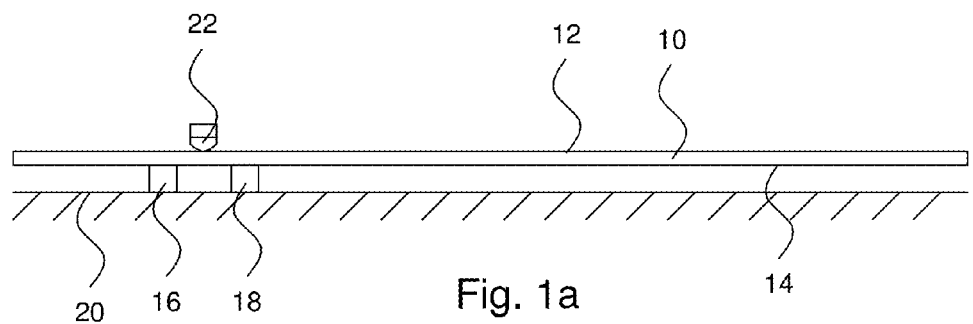
FIG. 1a is a view of a stringer undergoing a punching operation.
Figure 1B:
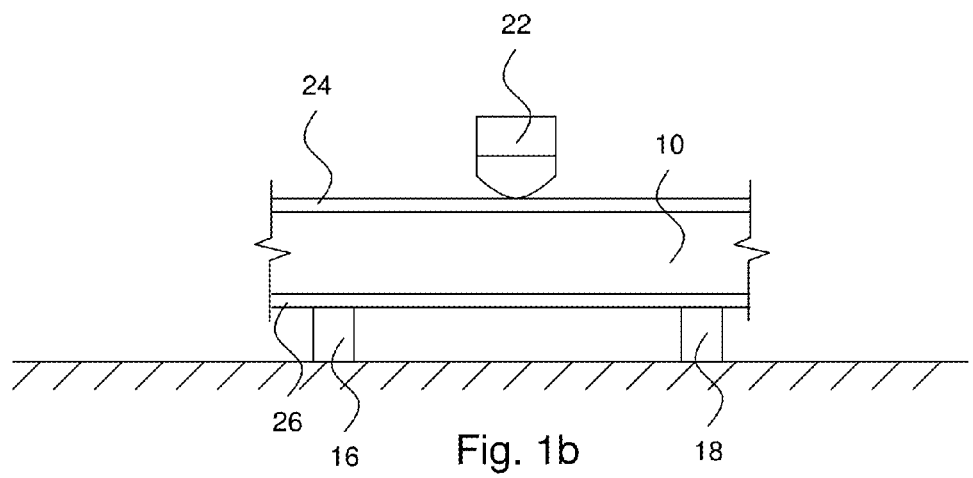
FIG. 1b is a close-up view of the stringer of FIG. 1a, pre-punching.

Turning to FIG. 1a, an elongate aircraft wing stringer 10 is shown having an upper surface 12 and a lower surface 14. As shown in FIG. 1b, the example stringer is an I-beam having a top flange 24 and a bottom flange 26.

The stringer 10 is supported at its lower surface 14 on two space supports 16, 18 supported on ground 20. A punch 22 can be moved in a vertical direction in order to deform the stringer 10 between the two supports 16, 18. Such punching apparatuses are known and will not be described in detail here.

In order to deform the stringer to the profile of a desired aircraft wing, the punch 22 is pushed downwards with a force F by a punch deflection $d_{punch}$. $d_{punch}$ is defined as the amount by which the punch 22 is advanced from a starting position in contact with the top surface 12 of the stringer 10 to the position of FIG. 1c.

Figure 1C:
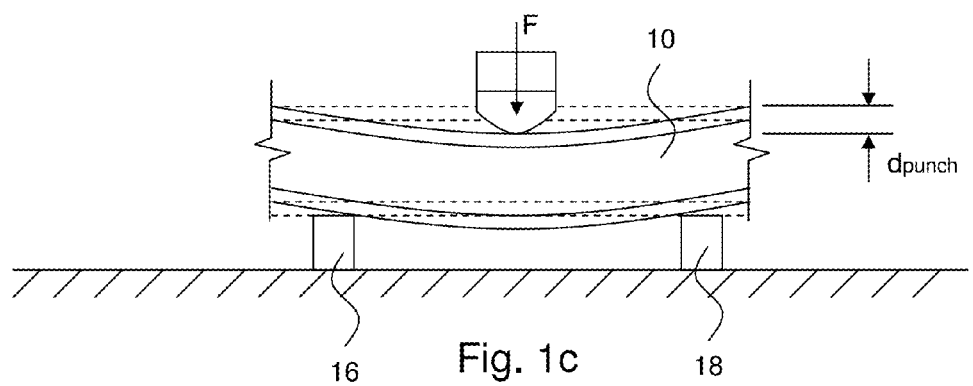
FIG. 1c is a close-up view similar to that of FIG. 1b during the punching operation.

As shown in FIG. 1c, as the punch 22 is advanced, the stringer 10 deforms both elastically and, eventually, plastically. The total deformation of the stringer at the point of contact with the punch is $d_{punch}$.

Figure 1D:
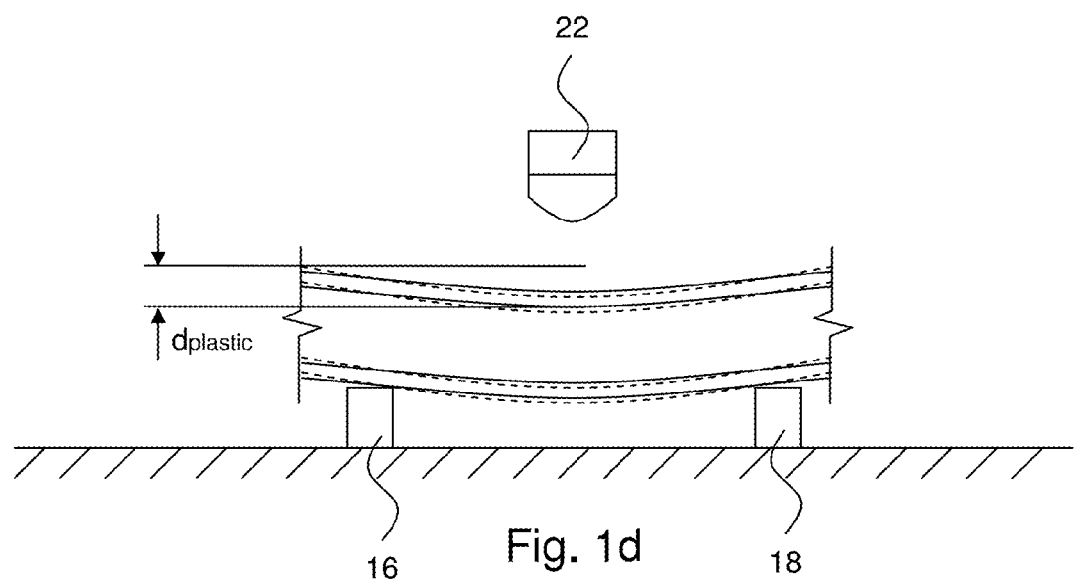
FIG. 1d is a close-up view similar to FIGS. 1b and 1c post punching.

Turning to FIG. 1d, the punch 22 has been retracted and the stringer 10 will spring back by an elastic punch limit, $d_{elastic}$, leaving a final punched deformation of $d_{plastic}$. As mentioned above, the method of obtaining the required $d_{plastic}$ is to progressively deform the beam, repeating the steps of FIGS. 1c and 1d, recording both $d_{punch}$ and $d_{plastic}$ until the desired deformation is met. Subsequent forming operations at that point along the beam are then used to refine this method until a suitable $d_{punch}$ is found for the required $d_{plastic}$.

Stringer cross sections vary along their length in both size and shape. The prior art iterative process must therefore be carried out for each individual punch location, of which there are many.

Assuming that the second moment of inertia and the neutral axis of the stringer between the supports 16, 18 is constant, $d_{plastic}$ can be calculated as follows:

$$\frac{d_{plastic}}{I_{xx}} = B_1 Y^2 + B_2 Y + B_3 \qquad (1)$$

where:
$I_{xx}$=Second moment of inertia of the beam cross section,
Y=Neutral axis of beam cross section, B1=Quadratic function of punch movement, $d_{punch}$ (see below)

B2=Quadratic function of punch movement, $d_{punch}$ (see below)

B3=Quadratic function of punch movement, $d_{punch}$ (see below)

$$B_1 = BB_{1a}(d_{punch} - d_{elastic})^2 + BB_{1b}(d_{punch} - d_{plastic}) \qquad (2a)$$

$$B_2 = BB_{2a}(d_{punch} - d_{elastic})^2 BB_{2b}(d_{punch} - d_{elastic}) \qquad (2b)$$

$$B_3 = BB_{3a}(d_{punch} - d_{elastic})^2 + BB_{3b}(d_{punch} - d_{elastic}) \qquad (2c)$$

where:
$BB_{1a}$, $BB_{1b}$ etc are material dependent constants to be determined.

Figures 2A, 2B:
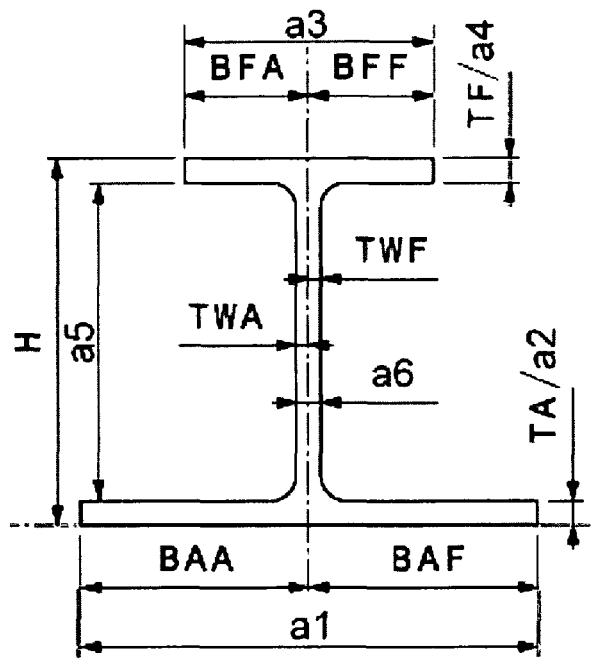
FIG. 2a is a cross section view of an I-stringer.
FIG. 2b is a table of various stringer cross-section geometries.

This series of equations is indeterminate. Therefore a numerical solution is used. Values for the various constants ($BB_{1a}$, $BB_{1b}$ etc) are derived from a number of selective numerical finite element analysis simulations. An example of a range of representative I-stringer geometries is shown in FIGS. 2a and 2b. The I-stringer shown in FIG. 2a has an upper flange having a thickness TF, a first portion to one side of the web having a length BFA and a second portion to the other side of the web having a length BFF; a web having a first thickness TWF at a first location and a second thickness TWA at a second location; and a lower flange having a thickness TA, a first portion to one side of the web having a length BAA and a second portion to the other side of the web having a length BAF. The I-stringer of FIG. 2a has a height H. The lower flange has a length a1 and a thickness a2 as shown in FIG. 2a. The upper flange has a length a3 and a thickness a4, as shown in FIG. 2a. The web has a height of a5 and a thickness a6 as shown in FIG. 2b.

Figures 3A, 3B:
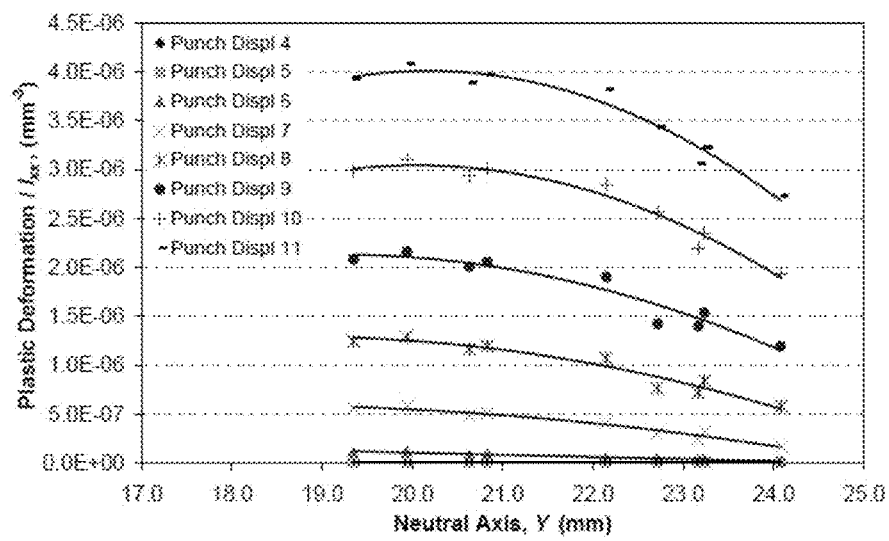

Once a representative number of FEA simulations have been run, say 8 different values of $d_{punch}$ from 4 to 11 mm for each of the cross sections listed in FIG. 2b, the results can be summarised as shown in FIG. 3a and plotted as shown in FIG. 3b, with values of $c_{plastic}/I_{xx}$ vs Y. These plots, for each constant value of $d_{punch}$ are thereby representative of equation (1) above.

From this analysis, a series of curves are retained such that the constants $BB_{1a}$, $BB_{1b}$ etc can be plotted against ($d_{punch} - d_{elastic}$). (NB the elastic punch limit $d_{elastic}$ is determined analytically). The least squares method used to calculate the values of $BB_{1a}$, $BB_{1b}$ etc.

Figure 4A:
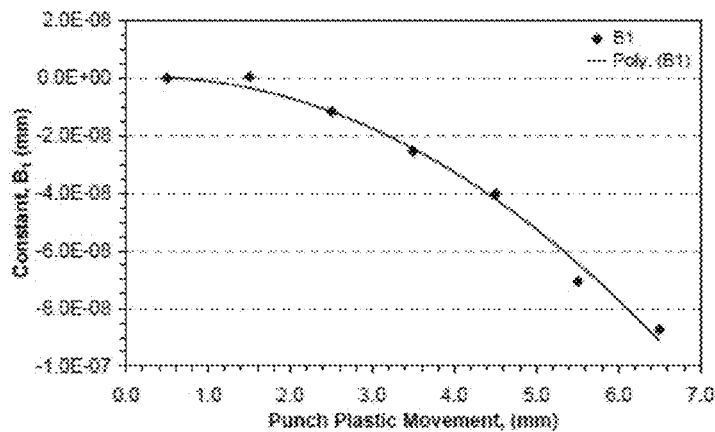
FIG. 4a is a graph of the quadratic function of punch movement B1.
Figure 4B:
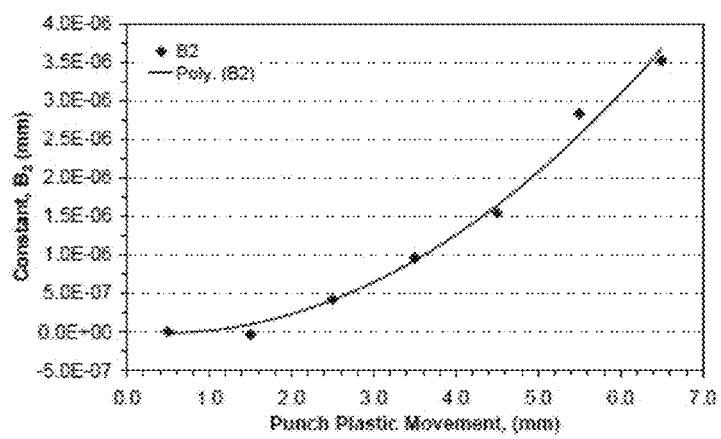
FIG. 4b is a graph of the quadratic function of punch movement B2.
Figure 4C:
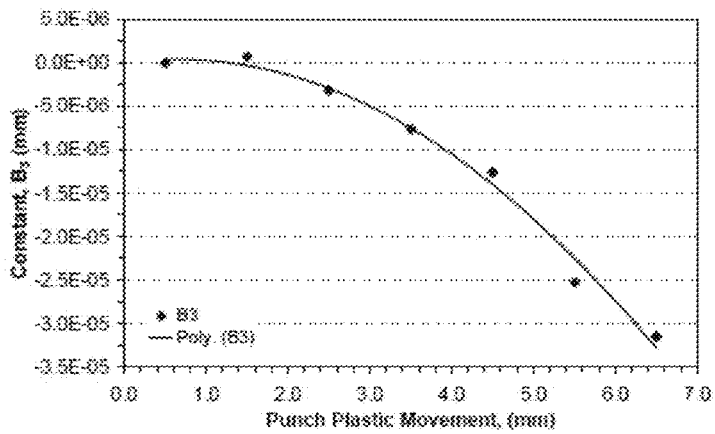
FIG. 4c is a graph of the quadratic function of punch movement B3.

This allows the relationship between $d_{punch}$ and each of $B_1$, $B_2$, $B_3$ to be plotted (see FIGS. 4a to 4c) and hence values of $BB_{1a}$, $BB_{1b}$ etc to be determined by least squares regression.

Once all of the constants have been determined, the value of $d_{punch}$ as a function of required plastic deformation $d_{plastic}$ can be predicted using the following relation:

$$d_{punch} = \left[ \left( \pm \sqrt{\begin{array}{c} I_{xx}(BB_{1b}Y^2 + BB_{2b}Y + BB_{3b})^2 + \\ 4I_{xx}d_{plastic}(BB_{1a}Y^2 + BB_{2a}Y + BB_{3a}) \end{array}} \right) - \frac{[BB_{1b}Y^2 + BB_{2b}Y + BB_{3b}]I_{xx}}{2I_{xx}(BB_{1a}Y^2 + BB_{2a}Y + BB_{3a})} \right] - d_{elastic}$$

In addition, the present invention provides a method of manufacturing using a prediction of the punch force required by the process.

Variations of the above embodiment fall within the scope of the present invention.

The invention claimed is:

1. A method of manufacturing an elongate component comprising:
   providing a punching apparatus configured to apply a differential contact three point bending load to the elongate component by advancing a punch by a punch travel dpunch at a punch location between two discrete supports by a punch distance,
   calculating the punch travel dpunch based on a second moment of inertia Ixx of the elongate component at the punch location, the location of the neutral axis Y of the elongate component at the punch location, and a desired plastic deformation dplastic of the component at the punch location, wherein second moment of inertia Ixx, the neutral axis Y and the desired plastic deformation dplastic are related as follows:

$$\frac{d_{plastic}}{I_{xx}} = \sum_{i=0}^{n} B_i Y^i$$

wherein Bi is calculated based on the following relationship:

$$B_i = \sum_{i=1}^{m} BB_{ij}(d_{punch} - d_{elastic})^j$$

where BBij are constants, delastic is an elastic punch limit of the elongate component.

2. The method of manufacturing an elongate component according to claim 1 in which n=2.

3. The method of manufacturing an elongate component according to claim 1 in which m=2 and n=2.

4. The method of manufacturing an elongate component according to claim 1 in which the punch travel is calculated from the expression:

$$d_{punch} = \left[ \frac{\left( \pm \sqrt{\left[ \begin{array}{c} I_{xx}(BB_{1b}Y^2 + BB_{2b}Y + BB_{3b})^2 + \\ 4I_{xx}d_{plastic}(BB_{1a}Y^2 + BB_{2a}Y + BB_{3a}) \end{array} \right]} - [BB_{1b}Y^2 + BB_{2b}Y + BB_{3b}]I_{xx} \right)}{2I_{xx}(BB_{1a}Y^2 + BB_{2a}Y + BB_{3a})} \right] - d_{elastic}$$

where BB1a, BB1b, BB2a, BB2b, BB3a and BB3b are constants.

5. The method of manufacturing an elongate component according to claim 1 in which the constants BB1a, BB1b, BB2a, BB2b, BB3a and BB3b are calculated statistically from a representative sample of numerical simulations.

6. The method of manufacturing an elongate component according to claim 5 in which the numerical simulations are finite element analyses.

7. A method of manufacturing an elongate component comprising:
   providing a punching apparatus configured to apply a differential contact three point bending load to the elongate component by advancing a punch at a punch location between two discrete supports by a punch distance;
   calculating analytically an elastic punch limit delastic;
   calculating a punch travel dpunch based on the second moment of inertia of the elongate component at the punch location Ixx, the location of the neutral axis of the elongate component at the punch location Y and the required plastic deformation dplastic of the component at the punch location, and bending the elongate component at the punch location by moving the punch by the punch travel dpunch,
   the punch travel dpunch is calculated assuming the required plastic deformation dplastic is related to the second moment of inertia of the elongate component at the punch location Ixx, and the neutral axis distance at the punch location Y by an nth order polynomial of the form:

$$\frac{d_{plastic}}{I_{xx}} = \sum_{i=0}^{n} B_i Y^i$$

wherein Bi is calculated based on the following relationship:

$$B_i = \sum_{i=0}^{m} BB_{ij}(d_{punch} - d_{plastic})^j$$

where BBij are constants, delastic is an elastic punch limit of the elongate component.

8. A method of manufacturing an elongate component comprising:
   providing a punching apparatus configured to apply a differential contact three point bending load to the elongate component by advancing a punch at a punch location between two discrete supports by a punch distance,
   calculating a punch travel dpunch based on the second moment of inertia of the elongate component at the punch location Ixx, the location of the neutral axis of the elongate component at the punch location Y and the required plastic deformation dplastic of the component at the punch location, wherein the punch travel is calculated assuming the required plastic deformation dplastic is related to the second moment of inertia of the elongate component at the punch location Ixx, and the neutral axis distance at the punch location Y by an nth order polynomials of the form:

$$\frac{d_{plastic}}{I_{xx}} = \sum_{i=0}^{n} B_i Y^i$$

$$B_i = \sum_{i=1}^{m} BB_{ij}(d_{punch} - d_{elastic})^j$$

where Bij are constants, delastic is an elastic punch limit of the elongate component, and n and m both equal two, where Bi are functions of the punch travel dpunch, and
   bending the elongate component at the punch location by moving the punch by the punch travel dpunch.

9. A method of manufacturing an elongate component comprising:
   providing a punching apparatus configured to apply a differential contact three point bending load to the elongate component by advancing a punch at a punch location between two discrete supports by a punch distance, calculating a punch travel dpunch is calculated from the expression:

$$d_{punch} = \left[ \left( \frac{\pm\sqrt{\left[\begin{array}{l} I_{xx}(BB_{1b}Y^2 + BB_{2b}Y + BB_{3b})^2 + \\ 4I_{xx}d_{plastic}(BB_{1a}Y^2 + BB_{2a}Y + BB_{3a}) \end{array}\right]} - [BB_{1b}Y^2 + BB_{2b}Y + BB_{3b}]I_{xx}}{2I_{xx}(BB_{1a}Y^2 + BB_{2a}Y + BB_{3a})} \right) \right] - d_{elastic}$$

wherein, Ixx is a second moment of inertia of the elongate component at punch location, Y is a location of a neutral axis of the elongate component at the punch location, dplastic is the required plastic deformation of the elongate component at the punch location, and BB1a, BB1b, BB2a, BB2b, BB3a and BB3b are constants, and bending the elongate component at the punch location by moving the punch by the punch travel dpunch.

\* \* \* \* \*